United States Patent
Makhijani et al.

(10) Patent No.: US 9,864,951 B1
(45) Date of Patent: Jan. 9, 2018

(54) RANDOMIZED LATENT FEATURE LEARNING

(71) Applicant: Amazon Technologies, Inc., Seattle, WA (US)

(72) Inventors: Roshan Harish Makhijani, Boston, MA (US); Benjamin Thomas Cohen, Seattle, WA (US); Grant Michael Emery, Seattle, WA (US); Vijai Mohan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 14/673,384

(22) Filed: Mar. 30, 2015

(51) Int. Cl.
| | | |
|---|---|---|
| G06E 1/00 | (2006.01) | |
| G06E 3/00 | (2006.01) | |
| G06F 15/18 | (2006.01) | |
| G06G 7/00 | (2006.01) | |
| G06N 3/08 | (2006.01) | |

(52) U.S. Cl.
CPC ..................... *G06N 3/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,814,107 B1* | 10/2010 | Thirumalai | ....... | G06F 17/30011 707/749 |
| 7,895,225 B1* | 2/2011 | Thirumalai | ......... | G06F 17/3071 707/748 |
| 7,904,462 B1* | 3/2011 | Thirumalai | ............ | G06Q 30/06 707/749 |
| 7,908,279 B1* | 3/2011 | Thirumalai | ......... | G06F 17/2211 704/10 |
| 7,970,773 B1* | 6/2011 | Thirumalai | ......... | G06F 17/2211 707/749 |
| 8,046,372 B1* | 10/2011 | Thirumalai | ....... | G06F 17/30616 707/749 |
| 8,112,376 B2 | 2/2012 | Raichelgauz | | |
| 8,873,813 B2 | 10/2014 | Tadayon | | |
| 8,959,037 B2 | 2/2015 | Raichelgauz | | |
| 9,195,714 B1* | 11/2015 | Thirumalai | ......... | G06F 17/3071 |
| 9,449,241 B2 | 9/2016 | Hager | | |
| 9,569,696 B1 | 2/2017 | Osindero | | |
| 9,615,136 B1* | 4/2017 | Emery | ............. | H04N 21/47202 |
| 9,652,682 B2 | 5/2017 | Hager | | |

(Continued)

OTHER PUBLICATIONS

Automatic video description generation via LSTM with joint two-stream encoding Chenyang Zhang; Yingli Tian 2016 23rd International Conference on Pattern Recognition (ICPR) Year: 2016 pp. 2924-2929 IEEE Conference Publications.*

(Continued)

*Primary Examiner* — Michael B Holmes
(74) *Attorney, Agent, or Firm* — Knobbe Martens Olson & Bear LLP

(57) ABSTRACT

Features are disclosed for identifying randomized latent feature language modeling, such as a recurrent neural network language modeling (RNNLM). Sequences of item identifiers may be provided as the language for training the language model where the item identifiers are the words of the language. To avoid localization bias, the sequences may be randomized prior to or during the training process to provide more accurate prediction models.

25 Claims, 7 Drawing Sheets

(56) References Cited

U.S. PATENT DOCUMENTS

| | | | |
|---|---|---|---|
| 9,767,409 B1* | 9/2017 | Makhijani | G06N 3/08 |
| 2014/0244631 A1 | 8/2014 | Arthur et al. | |

OTHER PUBLICATIONS

Predicting the Near-Weekend Ticket Sales Using Web-Based External Factors and Box-Office Data Seonghoon Moon; Suman Bae; Songkuk Kim 2014 IEEE/WIC/ACM International Joint Conferences on Web Intelligence (WI) and Intelligent Agent Technologies (IAT) Year: 2014, vol. 2 Pages 312-318 IEEE Conference Publications.*

A Hybrid Movie Recommender Based on Ontology and Neural Networks Yong Deng; Zhonghai Wu; Cong Tang; Huayou Si; Hu Xiong; Zhong Chen Green Computing and Communications (GreenCom), 2010 IEEE/ACM Int'l Conference on & Int'l Conference on Cyber, Physical and Social Computing (CPSCom) Year: 2010 pp. 846-851 IEEE Conference Publications.*

Some Like It Hot—Visual Guidance for Preference Prediction Rasmus Rothe; Radu Timofte; Luc Van Gool 2016 IEEE Conference on Computer Vision and Pattern Recognition (CVPR) Year: 2016 pp. 5553-5561 IEEE Conference Publications.*

Iyyer et al. "Political Ideology Detection Using Recursive Neural Networks." Proceedings of the $52^{nd}$ Annual Meeting of the Association for Computational Linguistics. pp. 1113-1122, Baltimore, Maryland, USA, Jun. 23-25, 2014.

Mikolov et al. "Distributed Representations of Words and Phrases and their Compositionality." pp. 1-9. Oct. 16, 2013.

Recurrent neural network. From Wikipedia, the free encyclopedia. Jan. 14, 2015. http:/en/Wikipedia.org/w/index.php?title=Recurrent_neural_network&printable=yes. pp. 1-8.

Analysis of EEG Signals and Facial Expressions for Continuous Emotion Detection Mohammad Soleymani; Sadjad Asghari-Esfeden; Yun Fu; Maja Pantie IEEE Transactions on Affective Computing Year: 2016, vol. 7, Issue: 1 pp. 17-28, DOI: 10.1109/TAFFC.2015.2436926 IEEE Journals & Magazines.

Web page recommendations using Radial Basis Neural Network technique C N Pushpa; Ashvini Patil; J. Thriveni; K R Venugopal; L M Patnaik 2013 IEEE 8th International Conference on Industrial and Information Systems Year: 2013 pp. 501-506, DOI: 10.1109/ICIInfS.2013.6732035 IEEE Conference Publications.

Component analysis of a Sentiment Analysis framework on different corpora Walaa Medhat; Ahmed H. Yousef; Hoda K. Mohamed 2014 9th International Conference on Computer Engineering & Systems (ICCES) Year: 2014 pp. 300-306, DOI: 10.1109/ICCES.2014.7030976 IEEE Conference Publications.

* cited by examiner

RANDOMIZED LATENT FEATURE LEARNING

CROSS-REFERENCE TO RELATED APPLICATIONS

This application is related to U.S. application Ser. No. 14/673,407 filed on Mar. 30, 2015, entitled "LATENT FEATURE BASED TAG ROUTING", which is hereby expressly incorporated by reference in its entirety. This application is also related to U.S. application Ser. No. 14/673,374 filed on Mar. 30, 2015, entitled "LATENT FEATURE BASED RECOMMENDATIONS", which is hereby expressly incorporated by reference in its entirety.

BACKGROUND

Computers and their capacities to process and store vast amounts of data present many interesting problems in efficient management of information. Data collections including millions of items can be stored. Such a catalog is useful in some implementations when it can be efficiently searched for items of interest.

Products, services, subscriptions, and other offerings are available via online sites. Online sites can provide recommendations of similar or related products based on what other customers have purchased or viewed. Nonetheless, these generic recommendations may not be effective to categorize a visitor and/or persuade the visitor to the online site to make a purchase.

Visitor activity may be used to generate predictions about a visitor. Such predictions may categorize and/or persuade a visitor. However, the amount of activity for a given visitor may be highly granular (e.g., many interaction data points such as mouse movements, purchases, page views, etc.) and collected over a long period of time (e.g., days, months, or years). Hence, there is a need for improved systems and methods of leveraging visitor activity for generating predictions for visitors.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
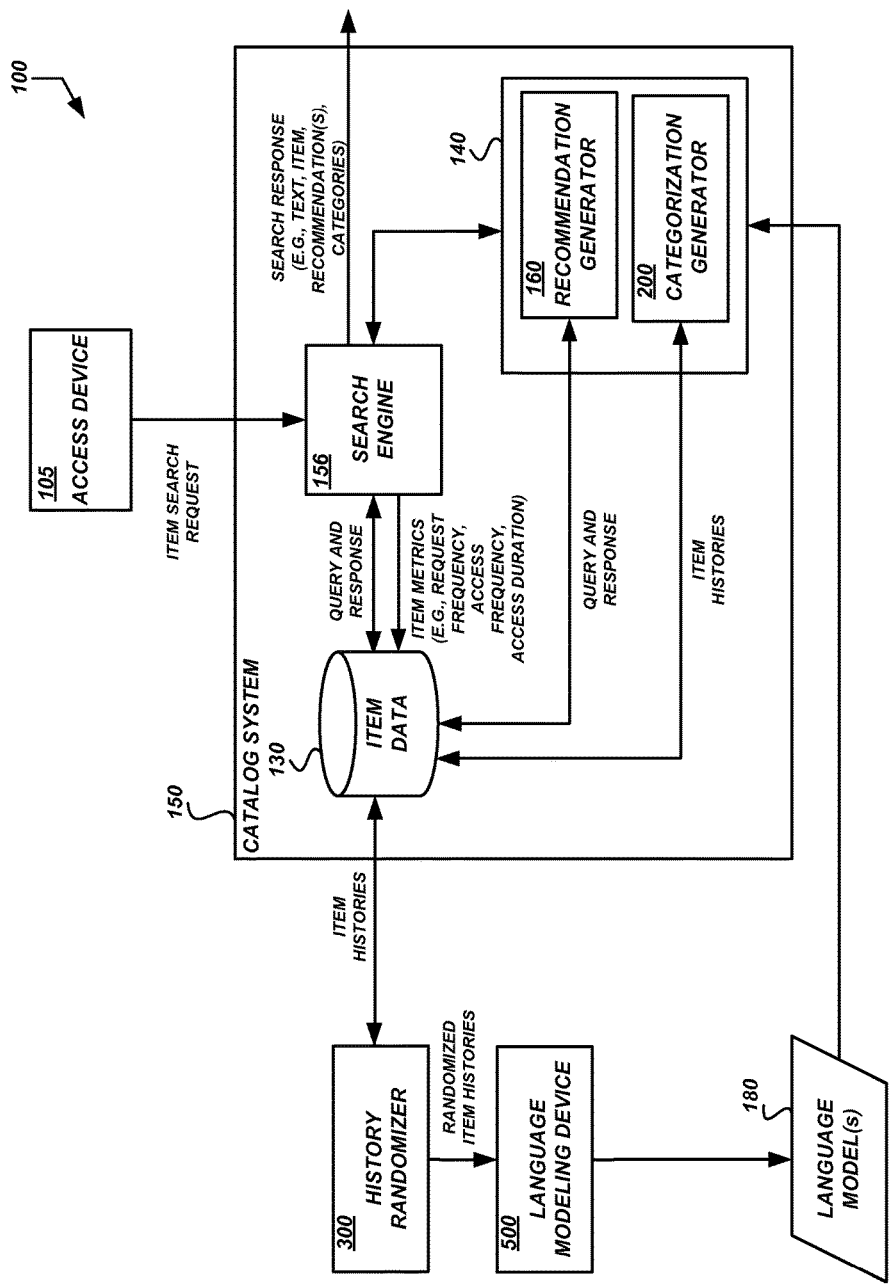
FIG. 1 is a network diagram of an example of a system incorporating randomized latent feature learning.

As discussed above, explicit features of items may be compared to explicit features of other items to determine whether items are related and thus can be recommended. Explicit features generally refer to objective information about an item such as size, color, manufacturer, title, artist name, or the like. Explicit features typically are static in nature changing infrequently.

The features described in further detail below include a language model, such as a recurrent neural network language model (RNNLM) or a neural network classification model built from a language model, trained to identify and/or classify latent features for items. Latent features, as compared to explicit features, generally refer to subjective contextual information about an item such as access history (e.g., purchase, view, read, listen, play, download, preview, etc.), history of providing feedback for an item (e.g., rating, comment, recommendation), listing history (e.g., adding to wish list, watch list, posting or linking to/via a third-party service such as social media, blog, email), or other behavioral data for items. A history generally refers to a collection of elements (e.g., accesses, feedback, and listing). The history may include information indicating an order for the collection of elements. In one implementation, the order will be sequential (e.g., chronological). In some implementations, history will be organized such as in chronological order where the first element is the most recent element and the last element is the oldest element. In some implementations, elements may include chronological information. One or more element may include an indication of quantity such as amount of movie accessed, duration of access, frequency of access, length of review, number of listings by a user for the element, and the like. For example, an access history element may be associated with a quantity of interaction. For example, how long a user viewed an item or how much of a song was played provided conveys additional subjective contextual information about the user's preference for the accessed item.

For purposes of clarity, "access history" may be used to discuss the examples below but it will be understood that one or more of the other subjective contextual information discussed may be used in conjunction with or in alternative to access history. Because latent features are behavior based, latent features may change over time.

An example of an explicit feature may be the title of a movie such as "Ishtar." A latent feature of the movie is that "Ishtar" tends to be accessed in close temporal proximity to "Elf." In this example, based on the latent features, it may be determined that "Ishtar" aligns well with existing moods, themes, and genres of "Elf." As such, a user who accesses "Ishtar" may be presented with a recommendation to access "Elf." The link between "Ishtar" and "Elf" may not be reflected in the explicit data (e.g., no user who viewed "Ishtar" also viewed "Elf"), but, based on the latent features, a commonality may be uncovered.

The model thus identifies similar latent features for items that are accessed in similar contexts. These features are then used to group and classify similar items. Once grouped, recommendations may be provided by finding items with particular moods, themes and/or genres that align with moods, themes and/or genres of previously accessed items.

Similarity can be a relative measure for items because a first item's similarity to a second item may be different than the first item's similarity to a third item. As such, the degree of similarity may be a used to further identify related items. In some implementations, this degree of similarity may be referred to as a strength value. Using the strength of similarity, a confidence metric may be generated to provide a relative measure as to how closely two items are related. This confidence metric can indicate a degree of certainty that one item is related to another. This confidence metric can be useful to prioritize which items are recommended and the order in which recommendations are presented to a user. In some implementations, the confidence metric may be referred to as a confidence score.

In some implementations, the latent features may be used to generate a prediction model such as a categorization model. The categorization model may predict one or more categories that describe the input (e.g., user access history) to the model. For example, the latent features may be provided as training input data to a neural network model training device. The latent features for previously categorized user may be provided and the model trained to provide categories that match the previously assigned categories for the provided latent features. The training process may include updating weights for hidden nodes included in the neural network. Hidden nodes of a neural network model may include paths. Paths may be associated with a weight value indicating whether a particular path is to be followed within the network model to a particular output (e.g., category). The weight values are stored in computer memory. The training may include adjusting the weight value for a path of a node and updating the other weights included in the model. One example of updating is back propagation.

As discussed above, latent features may change over time. For example, when using histories such as watch histories as the basis for generating models (e.g., recommendation models), for obtaining output from models, or predictively categorizing customers there may be a bias in the order of the items as they appear in the history which can skew predictions based on the history or models trained thereupon. To avoid localization bias when using histories as an input to learning functions, the present application describes features to randomize histories such that the latent associations are retained, while avoiding localization bias. For example, a dynamic randomization distance or window may be identified to selectively shuffle the order of items in a list.

For example, a recurrent neural network model may be trained using access histories (e.g., watch, download, purchase) users as a language. Once the training is complete, the learned parameters of the model may be used to generate recommendations by providing the features for a selected item to generate one or more recommendations. The generation may include executing a forward pass through model to generate recommendations. In some implementations, additional features may be included in the model to further weight the language features. Such additional features may include progress (e.g., how much of a particular movie or book was accessed), popularity (e.g., how often was a particular item accessed), date of access (e.g., when was an item accessed, when was the item access relative to its inclusion in the catalog), or the like. The model provides predictions as to what the user will access next based on how the network model is activated with his more recent watches.

As another example, histories may be used to generate a prediction for the user such as to categorize a user. For example, a set of items accessed by a visitor may include latent information about the taste in items of the user. Models such as neural network models can be trained using histories for categorized users. These models may then be used to predict a category for an uncategorized user using the user's item access history.

In these examples, the access histories are used as the language. In a natural language, if the network model is provided some words of a sentence, the model may predict the next word that the user will use based on a trained model. Rather than natural language words (e.g., English text), the present application treats the access histories of a user as a sentence and tries to complete that sentence for the user. The output of the network when activated with a set of item identifiers is a probability distribution over the entire set of items.

Features are disclosed for identifying randomized latent feature language modeling, such as a recurrent neural network language modeling (RNNLM). Sequences of item identifiers may be provided as the language for training the language model where the item identifiers are the words of the language. To avoid localization bias, the sequences may be randomized prior to or during the training process to provide more accurate models.

Although the examples and implementations described herein focus, for the purpose of illustration, on randomization for latent features, one skilled in the art will appreciate that the techniques described herein may be applied to other processes, methods, or systems. For example, the techniques may be used with other types of list based contextual systems which suffer from localization bias. Various aspects of the disclosure will now be described with regard to certain examples and embodiments, which are intended to illustrate but not limit the disclosure.

FIG. 1 is a network diagram of an example of a system incorporating randomized latent feature learning. As shown, an access device 105 transmits an item search request to a catalog system 150. The access device 105 may be an electronic communication device configured to transmit machine readable messages to the catalog system 150. Examples of the access device 105 include a smartphone, a tablet computer, a desktop computer, a laptop computer, a set-top-box, a streaming media device, a feature phone, and a television. The messages may be formatted according to a standardized protocol such as TCP/IP, HTTP, FTP, or the like. The transmission may be via wired or wireless means.

The item search request may include text input such as a search query term. The item search request may include audio data representing an utterance from a user. A search engine 156 included in the catalog system 150 receives the item search request. The search engine 156 is configured to search for items included in an item data storage 130 using the item search request information. For example, if the item search request includes audio data, the search engine 156 may be configured to obtain a transcription of the audio from an automatic speech recognition system. Using the transcription or, in the case where the search query term is provided in textual form in the item search request, the search engine 156 identifies items in the item data storage 130. The identification may be a literal identification (e.g., exact match between item data and the item search request). The identification may be a partial match (e.g., words with similar stems or synonyms matching). In some implementations, the search may be executed against an index of the item data storage 130.

As items are identified, the information about the items may also be retrieved from the item data store 130. The information about the items identified may be provided by the search engine 156 as a search response. The search response, in some implementations, may be transmitted back to the access device 105. In some implementations, the search response may be forwarded to another system. For example, if the item search request included an action in conjunction with the search (e.g., "play movie Ishtar"), if the movie was found, playback may be initiated as part of the search response from the search engine 156 by transmitting a message to a movie playing device. Accordingly items can be searched and accessed from the catalog. Accessing an item from the catalog, depending on the item's nature, may include playback, display, placing an order, delivery, download, printing, or otherwise providing at least a portion of an item.

The search engine 156 may be further configured to track metrics about item search requests and item accesses. For example, the frequency with which an item is access or the duration (e.g., how long) an item is accessed may be tracked. The tracking may be performed on a per device, per user, per account, per location (e.g., geographic location or area), per time period (e.g., time of day, day of week, month, or combination thereof), or other aggregation. The collected metrics can be used to identify the latent features of items as described in further detail below. The tracked metric information may be stored in the item data storage 130 or other memory device.

In addition to providing search results, the search engine 156 may be configured to initiate catalog data processes 140. The catalog data processes 140 shown in FIG. 1 include a recommendation generator 160 configured to provide recommendations for a user or user session and a categorization generator 200 configured to categorize the user or user session. The catalog data processes 140 may provide information for presentation to the access device 105 such as recommended items. The catalog data processes 140 may provide information for use by the catalog system 150 such as customer categorization. In some implementations, the result of one catalog data process may be used by a second catalog data process. For example, once a user or user session is categorized, the categories may be used by the recommendation generator 160 to provide additional items of interest to users within the identified categories. The recommendation generator 160 and the categorization generator 200 are two examples of catalog data processes 140 which generate predictions for a processing target. Other predictions may be generated by additional catalog processes (not shown) such as predicting erroneous data (e.g., defects) within the catalog system 150 or predicting user segmentations. For example, if the latent features indicate that items should be related, but the catalog system 150 does not reflect such a relation, there may be an error in the data for the items. The error may be due to incorrectly entered identifiers or another data entry error.

The search engine 156 may initiate one or more catalog data process 140 for a processing target. The processing target may be a user, an item, a visitor's browsing session, or other access group aggregated using one or more characteristic (e.g., geographical, temporal, demographic, behavioral, etc.). When the processing target is a user, the item access history for a user, including the current search (if any) is used to initiate the catalog data process 140. When the target is an item, the item may be the sole basis for the data process. When a visitor's browsing session is the processing target, the items accessed during the browsing session may be used as the basis for the processing. When the processing target is an aggregated access group, the items access by the aggregated access group may be used as the basis for the processing. It will be appreciated that while the current description is based on accessing the catalog system 150 via a search function, other forms of access may trigger the initiation of catalog data processes such as logging in, accessing a portion of the catalog system, or other functionality.

The categorization generator 200 may obtain item histories for the processing target to identify one or more categories for the processing target. The item histories may be obtained from the item data storage 130. In some implementations, the item histories may be obtained from another memory configured to store items accessed by the access device 105 during one or more sessions. The items may be used as an input to a latent feature language model 180 configured to provide recommended categorizations based thereon.

The recommendation generator 160 may utilize the item metrics collected by the catalog system 150 stored in the item data storage 130 such as the item metrics collected by the search engine 156 to generate recommendations. The items along with their metrics may be used in conjunction with the latent feature language model 180 to obtain recommendations.

The latent feature language model 180 may be a recurrent neural network language model or other model configured to receive input values and provide a predicted output. The recurrent neural network language model may be provided by a latent feature language modeling device 500, such as a recurrent neural network language modeling device, configured to obtain item data from the item data storage 130 (or another training data storage) and provide a model in response. For example, the latent feature language model 180 may be trained using access histories for multiple accounts. The access histories may be represented using unique item identifiers such as a universal product code, a standard identification number, or other alphanumeric identification string, and presented in sequential order of access. The training of the latent feature language model 180 may include skip-gram modeling or bag-of-word modeling of the access histories. One commercially available implementation for generating the latent feature language model 180 is the word2vec open source project hosted by Google, Inc. For a given item input value the model may provide one or more related items. The model may further provide a metric indicating a degree of relatedness between the input item and the outputted predicted items. In some implementations the latent feature language model 180 is a deep neural network model trained to provide categories as an output from a set of latent features.

As discussed above, during the training of the latent feature language model 180 by the latent feature training device 500 may include localization bias. To help reduce the localization bias, rather than receiving the item histories for training directly from the item data storage 130 at the latent feature training device 500, a history randomizer 300 may be included. The history randomizer 300, as described in further detail, is configured to dynamically randomize a list of items to reduce localization bias. Accordingly, the latent feature training device 500 may receive a randomized list of items for latent feature model learning which has a lower level of localization bias than a model trained with data as obtained from the item data storage 130. In some implementations, the history randomizer 300 may be included in the language modeling device 500.

Figure 2:
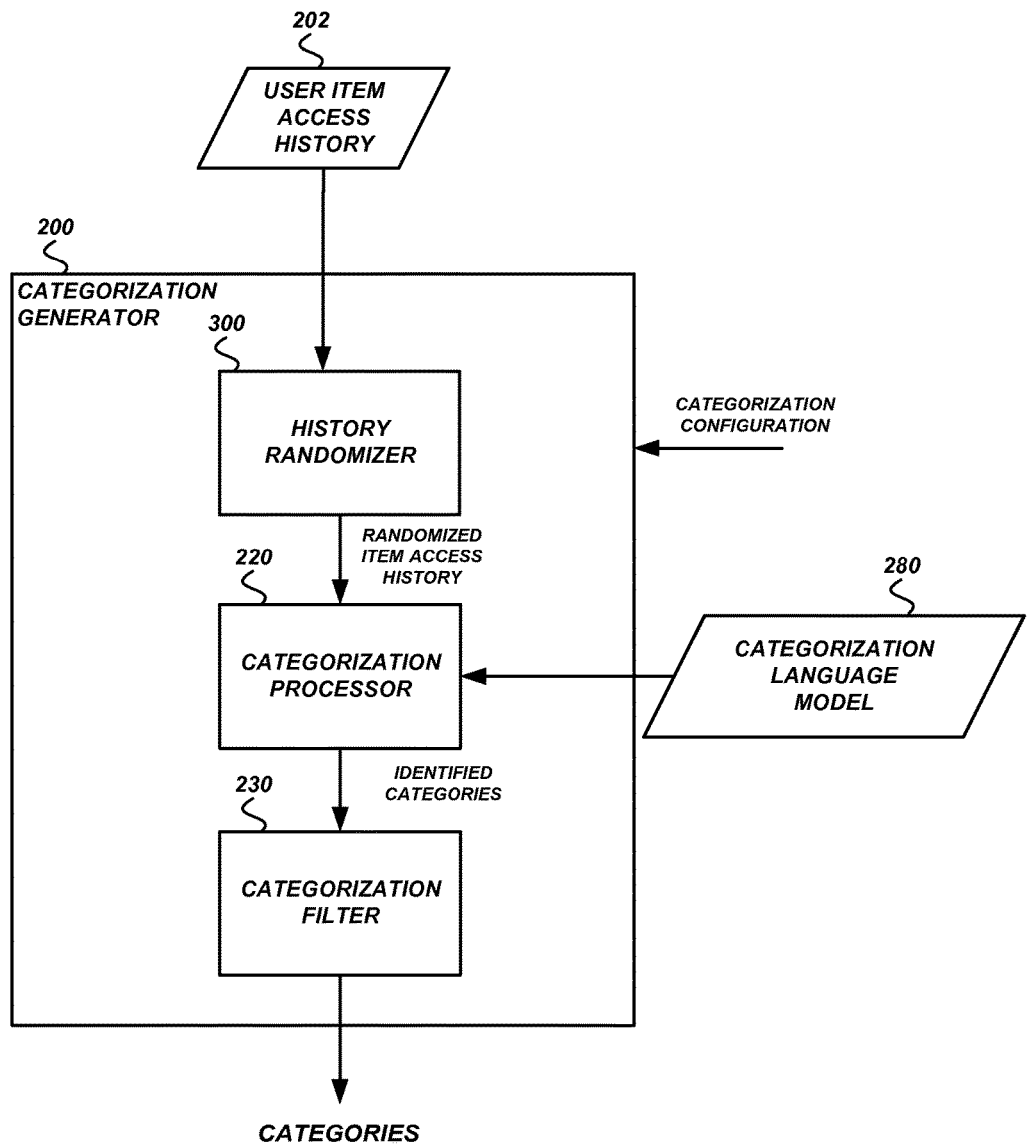
FIG. 2 is a functional block diagram of an example of a categorization generator.

FIG. 2 is a functional block diagram of an example of a categorization generator. The categorization generator 200 shown in FIG. 2 is one example of a device configured to generate a prediction for access histories using a latent feature prediction model. The categorization generator 200 may receive three inputs: a latent feature categorization model 280, a user item access history 202 identifying one or more items for the catalog data processing target, and a recommendation configuration. As noted above, if the data processing target is a user, the user item access history 202 may include a set of items accessed by the user. The set may include all items accessed by the user, items accessed by the user over a period of time, items of a given type or category (e.g., movie, book, food, electronics), or some combination thereof. If the data processing target is an aggregated group, the user item access history 202 may include a set of items accessed by the group. The set may include all items accessed by the group, items accessed by the group over a period of time, items of a given type or category (e.g., movie, book, food, electronics), or some combination thereof. If the data processing target is a visitor session, the user item access history 202 may include a set of items accessed during the session visiting the catalog system 150.

A session may generally be defined as a lasting connection between a user (or user agent) and the catalog system 150. The connection usually involves the exchange of multiple packets of data between the user's access device and the catalog system 150. A session is typically implemented as a layer in a network protocol (e.g., telnet, file transfer protocol (FTP)). In the case of protocols where there is no concept of a session layer (e.g., user datagram protocol (UDP)) or where sessions at the session layer are generally very short-lived (e.g., HTTP), virtual sessions may be implemented. In virtual sessions, each exchange between the user and the catalog system 150 may include some form of state storage such as a cookie. The cookie may persist a unique session ID, information about the user's preferences, or identifying information to allow tracking of the user's activity with the catalog system 150.

The history randomizer 300 may randomize the user item access history 202 as described herein. The history randomizer 300 may use the categorization configuration to adjust one or more features of the randomization process. For example, the history randomizer 300 may be configured to randomize locally or globally. Local randomization re-orders items within a certain segment of the history such as a period of time. Global randomization may randomize the entire set of items. The categorization configuration may also include a randomization scheme to apply. The randomization scheme may be applied dynamically such that certain windows are randomized according to one scheme while another window is randomized in a different way. For example, for items accessed over one year prior to the current date, the randomization may be more aggressive than the randomization applied to items accessed within the last year from the current date. This can help prevent over emphasizing latent features for older item accesses which may reflect older preferences and behaviors of a user than more recently accessed items. The randomization scheme and/or windows may also be dynamically determined based on the device performing the randomization. This allows the categorization generator 200 to adjust the quantity of resources (e.g., power, memory, processor cycles, therms, etc.) used to perform the randomization to fit current operational environment.

The randomized access history shown in provided to a categorization processor 220. The categorization processor 220 may provide the string of randomized item identifiers as an input to the latent feature categorization language model 280 to identify categories. The categorization processor 220 may be configured to obtain additional item information from the item data store 130 (not shown in FIG. 2) which can be provided as additional inputs to the latent feature categorization language model 280. For example, the weight given to a popular item may be higher than an item which was not as popular. As another example, the weight of an item in a user's history which was 90% watched or read may be higher than an item the user watched only briefly (e.g., 10% or less). As a further example, the date of access for an item may be used to weight recently accessed item higher than items accessed further in the past. This can be useful to accurately identify categories for the user's current behavior rather than treating all behavior from all time as the same.

The latent feature categorization language model 280 may identify one or more categories which may describe the processing target. The identified categories are potential categories which, based on the data processing target, have latent features which align with the identified categories. Categories may include: sporty, mainstream, luxury, family, patent attorney, trendy, outdoorsman, animal lover, tech-geek, dark, or other identifier generally describing the processing target. Each identified category may be associated with a metric indicating a degree of confidence in the predicted category for the input item(s).

A categorization filter 230 may be included to process the identified categories and provide a filtered list of categories. In some implementations, the categorization filter 230 may only include identified categories which meet a threshold level of relatedness in the output. For example, the latent feature categorization language model 280 may identify "herpetologist" as a category for a processing target history list which includes a book about iguanas and a brief period accessing the movie "Godzilla." However, the degree of confidence in the predicted category may be low. Accordingly, rather than provide categories of questionable value, the categorization filter 230 may exclude identified categories having a confidence level less than the threshold.

The threshold may be identified in the categorization configuration provided to the categorization generator 200. The threshold may be global (e.g., all categories identified by the model 280 must meet a minimal level of confidence). In addition or in the alternative, the threshold may be specified per user, per item type (e.g., book, movie, food), per geographic area, per device type to receive the categorization, or the like. Such a configuration allows the same hardware configuration to dynamically identify categories for processing target histories including various types of items and for users, if a user is the processing target, via a configuration update. The device type to receive the categorization may be included in the user item access history 202 provided to the categorization generator 200.

The categorization filter 230 may also prune the list using user data. For example, if a user has been previously categorized as one of the identified categories, providing this categorization may be redundant. Conversely, if a user had been previously categorized using a category identified by the latent feature categorization language model 280 but this category was removed (e.g., through manual updates, by user request), it may be desirable to exclude this identified category. Accordingly, the categorization filter 230 may access item data to determine whether the recommendation target has accessed or otherwise interacted with a candidate item. In some implementations, a user may have returned an item. As part of the return process, the user may have provided an indication of dissatisfaction with the item. In such instances, if this item is a candidate item, it may be desirable to exclude it from final the recommendation.

The categorization filter 230 may be configured to filter the list of identified categories based on a category value. For example, if a category is widely used by a system such as the catalog system 150, it may be desirable to include this category in a resulting list of suggested categories. However, if a category is rare, there may be lower value in providing this rare category than the widely used category. In such implementations, the categorization filter 230 may request information from the item data storage 130 (not shown in FIG. 2) and/or the categorization configuration to identify those categories which can be removed from the listing. The removable categories may be defined or be dynamically identified such as based on system usage, items associated with a category (e.g., if n number of items or more are associated with a category, include the category, otherwise, remove the category), value of items associated with a category (e.g., if cost (e.g., average, total, median, etc.) of items associated with a category is less than a threshold, omit the category), or other information available to the categorization generator 200.

The categorization filter 230 may be omitted in some implementations. In such instances, the categories identified by the categorization processor 220 may be provided as the output of the categorization generator 200. In some implementations, the filtering by the categorization filter 230 may be selectively performed. For example, if a resource level (e.g., power, memory, processor load, therms, etc.) for the device including the categorization generator 200 may cause the deactivation of the categorization filter 230 to avoid the filtering process and thereby preserve the device resources. The resource levels and their effect on the categorization filter 230 may be provided via the categorization configuration. The resource level information for the device may be provided to the categorization generator 200 or requested by one or more of the elements implemented therein.

The categorization filter 230 provides a filtered list of categories and, in some implementations, the confidence metrics for the categories included in the list. The categories are provided as an output from the categorization generator 200. As shown in FIG. 1, the categories may be included with the search results provided by the search engine 156.

Figure 3:
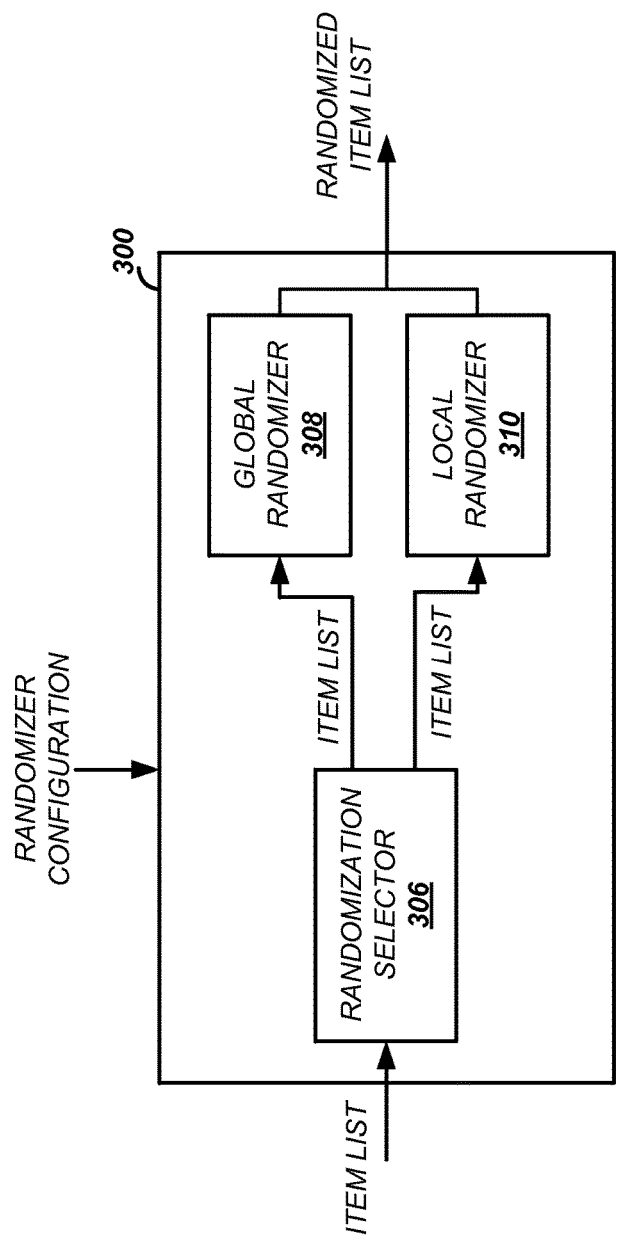
FIG. 3 is a functional block diagram of an example of an item list randomizer.

FIG. 3 is a functional block diagram of an example of a history randomizer. The history randomizer 300 shown accepts two inputs: an item list and a randomizer configuration. The item list may be a sequence of item identifiers such as a delimited string of identifiers, a structured data object (e.g., JSON), or an encoded data object (e.g., serialized Java object(s)).

The history randomizer 300 includes a randomization selector 306. The randomization selector 306 may be configured to route the item list to one of a local randomizer 308 or a global randomizer 310. The routing decision may be generated using the randomizer configuration. For example, the configuration may indicate that lists of a specified size should be globally randomized while lists including a number of items greater than the specified size should be routed to the local randomizer 308. The randomization configuration may include this specified size. As another example, it may be desirable to locally randomize certain item types while global randomization may be suitable for other item types. In such implementations, the randomization selector 306 may determine the types for items included in the item list and, if all or a substantial portion of the items are of the specified type, a randomizer is selected. The selection may be identified via the randomizer configuration which may associate an item type with one of local or global randomization.

The randomization selector 306 may be configured to select one of local or global randomization using factors other than the input item list. For example, the randomization selector 306 may chose a randomizer using resource availability for the device in which the history randomizer 300 is implemented. The randomization selector 306 may obtain a level for a resource and identify the randomizer for the obtained level. For example, if battery level is the resource, the randomizer configuration may indicate that when battery level is below 20%, the global randomizer 308 is to be selected.

The global randomizer 308 is configured to randomize the entire list provided to the history randomizer 300. The global randomizer 308 may be configured to perform a list randomization which includes switching the position of two or more items in the list. Which items are switched may be statically defined for the global randomizer 308. For example, the global randomizer 308 may iterate through the list and for each list location, switch the location with a random location within the list. In some implementations, the global randomizer 308 may be configured to obtain a randomization scheme such as by using the randomization configuration. For instance, the number of switches to perform may be specified in the randomization configuration. It may be desirable to perform 10 switches for lists of food items while a movie list may be switched 100 or 1000 times. The random number generation used by the global randomizer 308 may be dynamically configured. For example, a randomizer seed value may be specified in the randomization configuration. In some implementations, a random number source may be specified in the randomization configuration. The source may be identified, for example, using a URL. When accessed, the source provides a random number that can be used for the global randomization.

The history randomizer 300 shown in FIG. 3 includes a local randomizer 310. The local randomizer 310 may be configured to perform a list randomization which includes switching the position of two or more items within a segment of the list. To perform local randomization, the local randomizer 310 may obtain a segment or window size. The window also includes a starting point within the list. For example, a window of size 4 starting at position 0 would perform randomization for the items at positions 0, 1, 2, and 3 of the list. In this way, the window identifies a subset of items which will be randomized within the list. Once the window is identified, the positions of two or more items within the window are switched. Table 1 illustrates the states of a list undergoing one local randomization at for a window of size three starting at position 1.

TABLE 1

| Before Randomization | A1 B2 C3 D4 E5 F6 |
|---|---|
| After Local Randomization | A1 D4 B2 C3 E5 F6 |

In the example shown in Table 1, the candidates for randomization are B2, C3, and D4.

The window may be dynamically identified. For example, some product types may exhibit tolerance for localization bias. As such, the amount of randomization needed is less than the randomization that may be desired for products which are susceptible to localization bias. A larger window may be used for localization bias tolerant item types, while a smaller window may be identified for types which can be biased. The window size may be identified in the randomization configuration.

The starting point for the window may also be dynamically determined. The starting point may be determined using the dates of access. For example, items accessed within the last year may be included in a first window while items in the list accessed more than one year ago may be included in a second window. As with the window size, the starting point may be selected using the item types.

It should be appreciated that in some implementations, the local randomizer 310 may only randomize a portion of the item list and leave the remaining portions in the order provided. Because the local randomization limits the amount of randomization, the window size may be adjusted using the resources (e.g., memory, bandwidth, power) available for randomization.

Although several factors have been discussed (e.g., item type, randomization resources, etc.) independently, it should be appreciated that two or more of these factors may be considered when determining the size of the randomization window. For example, the local randomizer 310 may include a weighted function which receives the factors and generates the window size. Equation 1 below is one example of such a weighting function to determine the window size for a homogenous list of items (e.g., all items of same item type).

$$\text{window\_size} = (\text{percent\_power} - 10) * \text{list\_size} * \text{item\_type\_bias} \quad \text{Eq. (1)}$$

where window_size is the size of the window to be determined such that any positive number will identify the number of items to include in a local randomization window, percent_power is the percent of capacity power the device performing the local randomization, list_size is the size of the item access list provided for randomization, and item_type_bias is decimal value greater than 0 and not larger than 1, where a lower value is associated with item types susceptible to localization bias.

In some instances, the item list may include various item types. In such instances, the local randomizer 310 may include a weighted function which further considers the item types included in the item list. For example, the item_type_bias from Equation 1 may be a summation of biases weighted using the number of items in the list of the respective item types.

Having identified the windows for randomization, which items are to be switched may be statically defined for the local randomizer 310. For example, the local randomizer 310 may iterate through the window and for each list location within the window, switch the location with a random location within the window. In some implementations, the local randomizer 310 may be configured to obtain a randomization scheme such as by using the randomization configuration. For instance, the number of switches to perform may be specified in the randomization configuration. It may be desirable to perform 10 switches for lists of food items while a movie list may be switched 100 or 1000 times. The scheme may be dynamically determined for each window. For example, a first window may be more rigorously randomized (e.g., 300 switches) than a second window (e.g., 50 switches).

As with the global randomizer 308, the random number generation used by the local randomizer 310 may be dynamically configured. For example, a randomizer seed value may be specified in the randomization configuration. In some implementations, a random number source may be specified in the randomization configuration. The source may be identified, for example, using a URL. When accessed, the source provides a random number that can be used for the global randomization.

The history randomizer 300 provides the locally or globally randomized list as an output. In some implementations, the history randomizer 300 may also provide information about the randomization that was performed. For example, information included in the randomization configuration may be provided with the randomized list. If localized randomization was performed, the number of windows, size of windows, and starting point for each window may be provided. In this way, the device receiving the randomized list can assess whether the randomization was sufficient for a particular purpose (e.g., training a recommendation model, automatic speech recognition, customer classification).

Figure 4A:
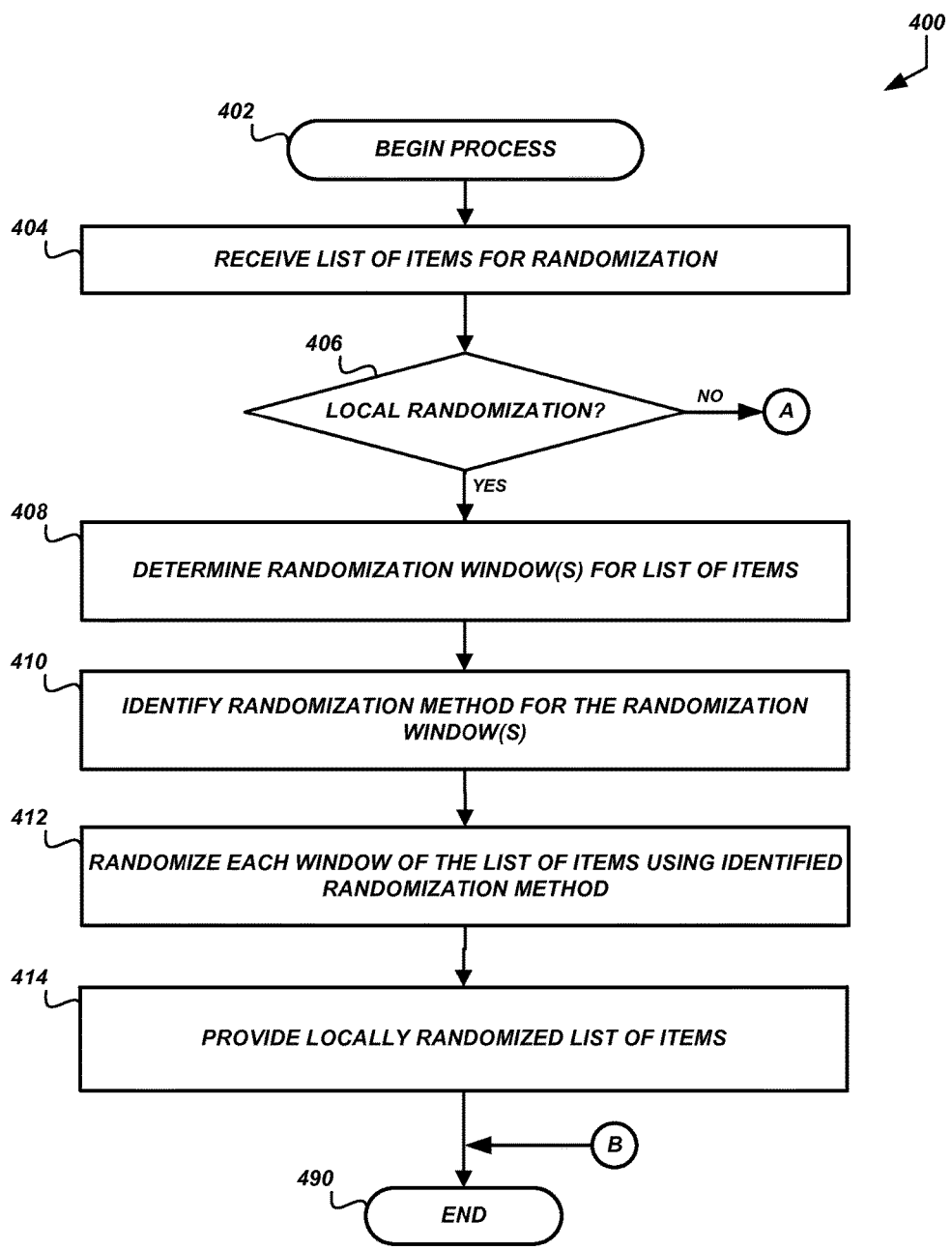
FIGS. 4A and 4B show a process flow diagram of an example method of item list randomization.
Figure 4B:
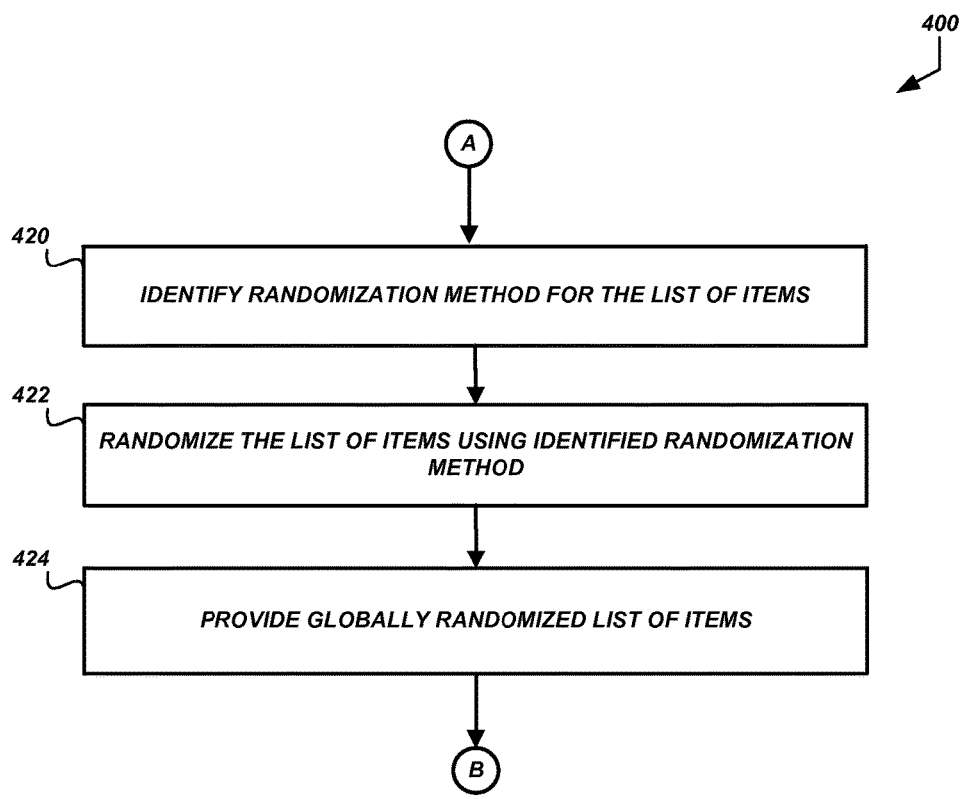

FIGS. 4A and 4B show a process flow diagram for a method of randomizing item history lists. The method 400 may be implemented in whole or in part by one or more of the devices described herein such as the history randomizer 300.

The method 400 begins at block 402. At block 404, a list of items is received for randomization. As discussed above, the list of items may be provided using item identifiers. The list of items may be associated with a processing target such as a user, a user session, or a group of users/user sessions. At decision block 406, a determination is made as to whether the randomization with be local or global. The determination may be based on one or more of the item list, the processing target, or resource levels for the device performing the randomization. For example, if the item list is relatively small, global randomization may be suitable. The size of the list may be included in the randomization configurations such that global randomization is selected for lists having a specified number of items or fewer. The types of items included in the list may also be considered. For example, a majority item type may be identified for the item list. The majority item type will indicate the item type which appears most frequently in the provided list. The type information may be obtained from the item data storage 130. As another example, if the processing target is a visitor rather than an identified user, it may be desirable to perform global rather than local randomization because the visitor session may reflect a current taste for the visitor. If resource levels are utilized, a specific resource quantity may be associated with a randomization configuration such that if the resource meets or falls below the indicated quantity, an associated randomization is selected. For instance, if the resource is power, local randomization may include more computations and thus power to perform. Accordingly, in such instances, a configuration may be provided such that if power available for the device is below a threshold, global randomization is selected.

If the determination at decision block 406 is that local randomization is to be performed, the method 400 continues to block 408. At block 408, one or more randomization windows are determined for the list. Identifying a window may include identifying a starting point within the item list for the randomization window as well as a size for the window identifying how many items will be randomized together. The window may be specified using a number of items or proximity of items. For example, a window of three may be specified whereby for an item in a list, the window includes the item and the item in the list position prior to the item and the item in the list position following the item. This may generally be referred to as a list proximity window. In some implementations, the window may be specified temporally such that items are grouped based on proximity in access time. Accordingly, windows may be identified for items access within the same period of time (e.g., week, month, quarter, etc.).

At block 410, a randomization method is identified for each window. In some implementations, the same method may be identified for all windows. In some implementations, it may be desirable to randomize dynamically wherein the item list, the processing target, resource levels of the device performing the randomization, or window size may be used to determine the randomization method. This allows the device to manage its resources as well as to adjust configuration to allow the same hardware to be used for randomizing many different lists.

Having identified the windows and randomization to perform for each window, at block 412, each window is randomized according to the identified randomization. At block 414, the locally randomized list is provided. As discussed above, providing the locally randomized list may also include providing the identified windows and/or randomization method(s) used. At block 490, the method 400 ends.

Returning to decision block 406, if the determination is made that global randomization is to be performed, the method 400 continues as shown in FIG. 4B.

At block 420 of FIG. 4B, a randomization method is identified for the list. In some implementations, it may be desirable to randomize dynamically wherein the item list, the processing target, resource levels of the device performing the randomization, or window size may be used to determine the randomization method. This allows the device to manage its resources as well as to adjust configuration to allow the same hardware to be used for randomizing many different lists.

Having identified the randomization to perform, at block 422, the list is randomized according to the identified randomization. At block 424, the globally randomized list is provided. As discussed above, providing the globally randomized list may also include providing the identified randomization method used. Returning to FIG. 4A, at block 490, the method 400 ends.

Figure 5:
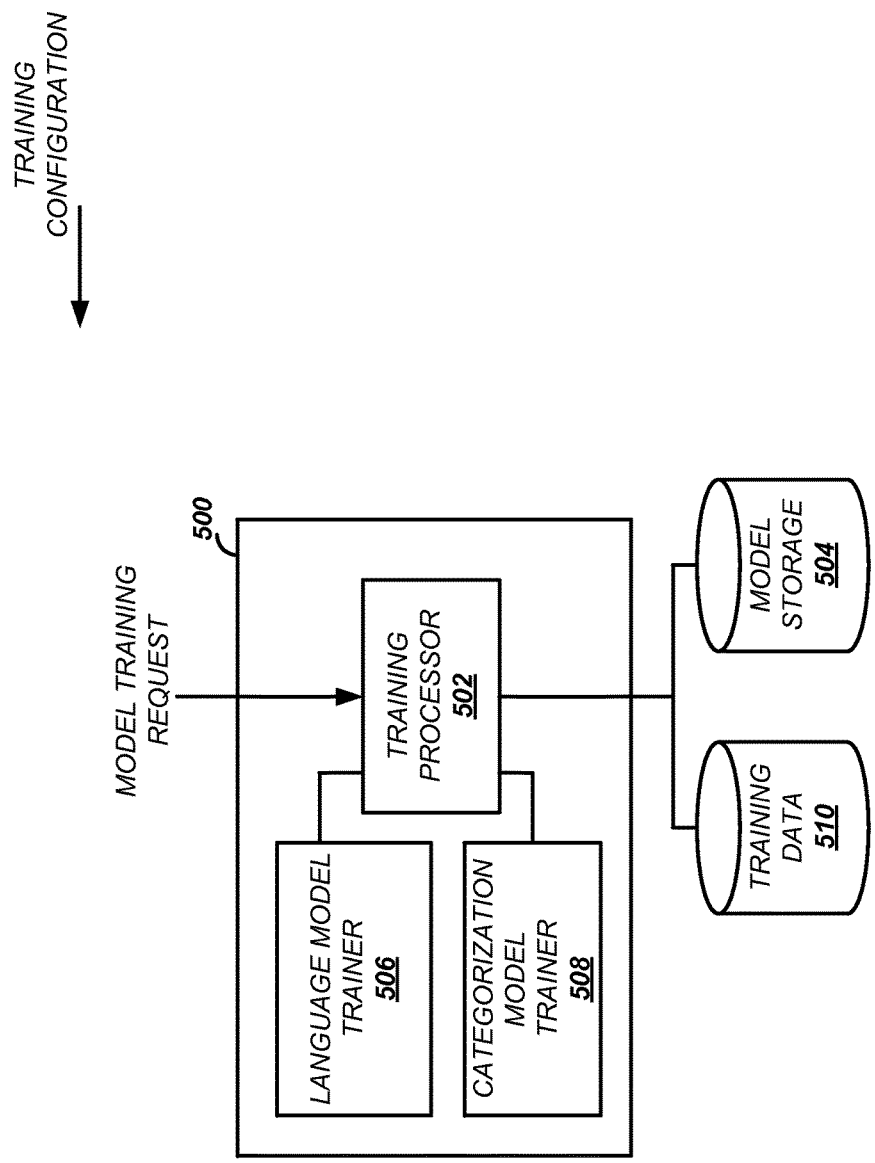
FIG. 5 is a functional block diagram of an example of a latent feature language modeling device.

FIG. 5 is a functional block diagram of an example of a latent feature modeling device. The latent feature language modeling device 500 may be used to train models, such as recurrent neural network language models or deep neural network models. The system 100 may include the latent feature language modeling device 500 or be in data communication with the latent feature language modeling device 500. The latent feature language modeling device 500 shown in FIG. 5 is a simplified modeling device intended to highlight certain aspects of model training. The latent feature language modeling device 500 may include addition elements including one or more of a power source, memory, a transmitter, a receiver, a transceiver, or a network interface to expand the capabilities of the latent feature language modeling device 500.

The latent feature language modeling device 500 includes a training processor 502. The training processor 502 is a specially configured processing device which coordinates the training of models. The training processor 502 may be implemented as a circuit or as an electronic device configured to execute one or more instructions to perform the model training described.

The training processor 502 may receive a training configuration message. The training configuration message may include an identification of a model to train, if retraining an existing model. The identification may be a value which is associated with the model data stored in a model storage 504. If the model is not found in the model storage 504, the training processor 502 may be configured to create a new model using the provided identification information. In some implementations, the training configuration message may be included in the model training request. In such implementations, the device requesting the training can specify the parameters for training such as the desired accuracy or training data for the requested model.

The training configuration message may also indicate the type of model to be trained. For example, the training processor 502 may be dynamically configurable to train different neural network models using different learning techniques.

The latent feature language modeling device 500 shown in FIG. 5 may be used to train two types of models, namely a latent feature identification model and a latent feature categorization model. To support latent feature identification models, the latent feature language modeling device 500 may include a latent feature language model trainer 506. The latent feature language model trainer 506 is configured to train a latent feature identification model using an identified set of training data, such as item access histories. The latent feature language model trainer 506 may receive one or more messages identifying the model and data set for training. The data set may be specified for a set of users and/or a set of item types. The data set may be limited in time (e.g., histories from the past n-days).

Once received, the latent feature language model trainer 506 may be configured to obtain the identified model from the model storage 504. The latent feature language model trainer 506 may also be configured to obtain the identified training data from a training data storage 510. In some implementations, the training data may be obtained directly from the item data storage 130.

As noted above, the training data access histories may be represented using unique item identifiers such as a universal product code, a standard identification number, or other alphanumeric identification string, and presented in sequential order of access. The training of the latent feature language model 180 may include skip-gram modeling or bag-of-word modeling of the access histories. The latent feature language model trainer 506 may be implemented in whole or in part with a modeling tool such as word2vec discussed above. The latent feature language model trainer 506 may receive the configuration parameters for the training via the training configuration. For example, when skip-gram modeling, a distance is typically provided to identify the skip length. This length may be specified in the training configuration for use by the latent feature language model trainer 506 in generating the latent feature model.

Once trained, the model may be stored in the model storage 504. It will be appreciated that a catalog system may include several latent feature models. For example, one model may be generated and used for recommending movies, while a second model may be generated and used for recommending music. Accordingly, item type may be a factor is deciding which model to use for a given recommendation target. Other factors which may be used to decompose the models are geography, demographics (e.g., gender, age, estimated income), or the like. The model storage 504 may be configured to provide latent feature models to the recommendation generator 200 as described above.

To support categorization models, the latent feature language modeling device 500 may configure the latent feature language model trainer 506 to provide categories as the output of the model rather than a set of latent features. In some implementations, it may be desirable to separate the identification of latent features from the categorization modeling. In such implementations, the latent feature language modeling device 500 may include a categorization model trainer 508. The categorization model trainer 508 may a neural network model configured to provide predicted categories for a set of input values such as item access histories.

In such an implementation, the feature vectors for all item identifiers (or all item identifiers of one or more item types) may be obtained to provide a vocabulary representing the catalog. This may be achieved by obtaining access histories for multiple users. The histories are represented by a sequence of item identifiers. A modeling tool such as word2vec may be included to extract feature vectors for each item.

Once the vocabulary has been obtained, the categorization model may be trained. It should be noted that one non-limiting advantage of these features is that the full catalog need not be provided to train the categorization model. Instead, the feature vectors, which represents a subset of the information included in the catalog, can be used for machine learning. The output of the categorization model will be categories that are associated with the provided inputs (e.g., item access history list). The categorization model is then trained to learn how the weights of the feature vectors correspond to the various customer categories. The training process may be feedforward neural network modeling with back-propagation for updating the weights between nodes of the neural network. The training process may be iteratively adjusting parameters of an equation such as via a genetic algorithm. Other machine learning techniques may be applied to generate the classification model.

Once the categorization model is generated, it may be used by one or more of the catalog data processes to categorize a processing target. For example, a categorization identified by the categorization generator 200 for a processing target may be used by the recommendation generator 160 to provide item recommendations for the processing target.

The latent feature language modeling device 500 shown in FIG. 5 is one example including several features described. In some implementations, the latent feature language modeling device 500 may omit the categorization model trainer 508, such as in systems which do not categorize user access histories.

The latent feature language modeling device 500 may include a history randomizer such as the history randomizer 300 shown in FIG. 3. In such implementations, the randomization may be selectively applied such as using a control value included in the model training request. For instance, the model training request may include an indication of the randomization configuration to be used for the requested model training.

Figure 6:
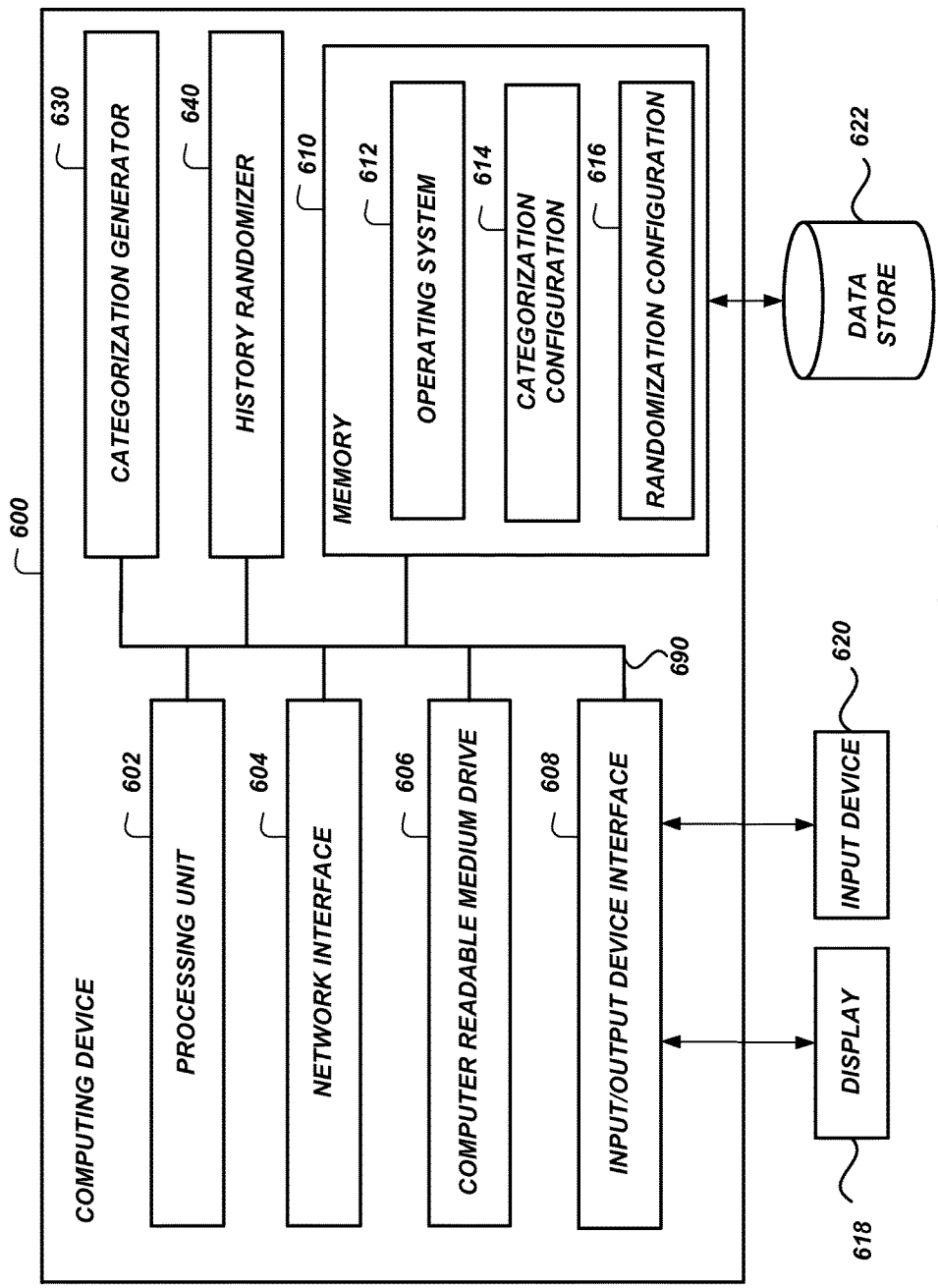
FIG. 6 is a functional block diagram of a computing device for providing randomized latent feature learning.

FIG. 6 is a functional block diagram of a computing device for providing randomized latent feature learning. The computing device 600 can be a server or other computing device, and can comprise a processing unit 602, a categorization generator 630, a history randomizer 640, a network interface 604, a computer readable medium drive 606, an input/output device interface 608, and a memory 610. The network interface 604 can provide connectivity to one or more networks or computing systems. The processing unit 604 can receive information and instructions from other computing systems or services via the network interface 604. The network interface 604 can also store data directly to memory 610. The processing unit 602 can communicate to and from memory 610 and output information to an optional display 618 via the input/output device interface 608. The input/output device interface 608 can also accept input from the optional input device 620, such as a keyboard, mouse, digital pen, microphone, mass storage device, etc.

The memory 610 contains computer program instructions that the processing unit 602 executes in order to implement one or more embodiments. The memory 610 generally includes RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes a categorization configuration 614. The categorization configuration 614 may include one or more latent feature models (or pointer thereto) for category generation, categorization relatedness thresholds, filtering criteria, and/or sorting criteria as described above. The categorization configuration 614 may store specific values for a given configuration. The categorization configuration 614 may, in some implementations, store information for obtaining values for a given configuration. For example, a latent feature model for automotive accessories may be specified as a network location (e.g., URL) in conjunction with username and password information to access the model.

In some embodiments, the memory 610 includes a randomization configuration 616. The randomization configuration 616 may include one or more randomization methods, number randomization information (e.g., random number seed, location of a random number generator, random number function name), window size, or window start point as described above. The randomization configuration 616 may store values for a given configuration. The randomization configuration 616 may, in some implementations, store information for obtaining a given configuration. For example, a random number generator web-service may be specified as a network location (e.g., URL) in conjunction with username and password information to access the service to obtain random numbers for the randomization.

The memory 610 may also include or communicate with one or more auxiliary data stores, such as data store 622. The data store 622 may electronically store data regarding models, item types, items, categories, training data, and the like.

The memory 610 may also include or communicate with one or more auxiliary data stores, such as data store 622. The data store 622 may electronically store data regarding models, item types, items, and the like.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 602 may not be coupled to a display 618 or an input device 620. In some embodiments, two or more computing devices 600 may together form a computer system for executing features of the present disclosure. In some implementations, the history randomizer 640 may be implemented in part with the categorization generator 630.

As one example implementation, several of the features discussed above may be included in system. The system includes a computer-readable memory storing executable instructions. The system further includes one or more physical computer processors in communication with the computer-readable memory. The one or more physical computer processors are programmed by the executable instructions to obtain sequences of movie identifiers indicating a history of movies watched by users. The processors are further programmed by the executable instructions to identify a first history randomization profile for the sequences of movie identifiers. The first history randomization profile include information indicating that every movie identified in each of the sequences of movie identifiers is a candidate for randomization or that a first subset of movies identified in each of the sequences of movie identifiers which are candidates for randomization. A candidate for randomization is an item included in a sequence of movie identifiers that may be moved to a new location within the sequence of movie identifiers. The processors are further programmed by the executable instructions to generate randomized sequences of movie identifiers by randomizing the sequences of movie identifiers using the first history randomization profile. The processors are also programmed by the executable instructions to transmit the randomized sequences of movie identifiers to a recurrent neural network language modeling device. The processors are also programmed by the executable instructions to receive a recurrent neural network language model. The model includes latent feature vectors identifying a categorization for an input sequence of previously accessed movies. The categorization describes the sequence of previously accessed movies. The processors are also programmed by the executable instructions to receive a request from an access device of a user. The request includes information indicative of an access history for the user. The processors are also programmed by the executable instructions to identify a user sequence categorization for the user using the recurrent neural network language model and the access history for the user.

In some implementations, the recurrent neural network language model includes a skip-gram model of the sequences of movie identifiers identifying latent common features between movies. At least one of frequency of access or duration of access for the movies included in the access history for the user may be used as an input weighting factor to weight the respective movie identifier input to the recurrent neural network language model. In addition or in the alternative, one or both of frequency of access and duration of access for the movies included in the access history for the user may be used as a result weighting factor to weigh the respective latent feature output generated using the respective movie identifier as an input.

The system may include instructions to identify a second history randomization profile for access history for the user. The second history randomization profile may include information indicating that every movie identifier included in the access history is a candidate for randomization, or that a first subset of movie identifiers included in the access history which are candidates for randomization. The instructions may be provided to generate a randomized access history by randomizing the movie identifiers included in the access history using the second history randomization profile. In such implementations, identifying the user sequence categorization for the user may use the randomized access history for the user.

As another example implementation of the innovative features described, a computer-implemented method may be provided. The method is performed under control of one or more computing devices configured with specific computer-executable instructions. The method includes obtaining sequences of item identifiers indicating a history of items accessed. The method includes randomizing the order of item identifiers included in at least a portion of the sequences of item identifiers to generate randomized sequences of item identifiers. The method also includes generating a language model (e.g., a recurrent neural network language model) using the randomized sequences of item identifiers as the words of the language modeled by the language model. The language model is configured to provide one or more candidate predictions for items of a processing target. The method further includes receiving a request from an access device of a processing target, the request including information indicative of items for the processing target. The method further includes generating a candidate prediction for the processing target using the language model and the items for the processing target. The method also includes providing a prediction for the processing target using the candidate prediction.

In implementations where the generating language model includes generating a recurrent neural network language model, the generating may include skip-gram modeling of the sequences of item identifiers to identify latent common features between items.

The processing target of the method may include one of: a user of the access device; a session initiated by the access device; or an aggregation of items, the items aggregated from access histories of multiple users having common geographic, demographic, or behavior characteristics.

The method may include obtaining item access metrics for the items for the processing target. In such implementations, generating the candidate prediction includes weighting an item included in the items for the processing target using the associated item access metric for the item when processed by the language model.

The method may include obtaining a value indicating a strength of relatedness to the processing target for the candidate prediction.

The method may include identifying a second candidate prediction. Providing the prediction may include obtaining a first strength value for the candidate prediction and a second strength value for the second candidate prediction. The first strength value indicates a higher degree of relation for the candidate prediction than the second strength value for the second candidate prediction. Providing the prediction may also include selecting the candidate prediction as the prediction using the first strength value and the second strength value. Providing a prediction, in some implementations of the method, may include obtaining a strength value for the candidate prediction, obtaining a minimum candidate strength, selecting the candidate prediction as the prediction when the strength value is greater than or equal to the minimum candidate strength.

Generating the language model may include generating a neural network prediction model. Generating such a model may include generating a latent feature language model using the randomized sequences of item identifiers as the words of the language modeled by the latent feature language model. Generating such a model may also include obtaining a training data set, the training data set including sequences of item identifiers and previously assigned predictions for the sequences. Generating such a model may also include obtaining latent features for the categorized sequences of item identifiers. Generating such a model may also include generating the neural network prediction model using the training data set, wherein inputs to the neural network prediction model include the obtained latent features for the sequences of item identifiers.

The method may further include generating a randomized list of item identifiers by randomizing the order of item identifiers included in at least a portion of item identifiers for the items for the processing target. In some implementations, generating the candidate prediction for the processing target uses the randomized list of item identifiers for the processing target.

As a further example implementation, a non-transitory computer readable medium storing a computer-executable module that, when executed by a processor of a computing device, that causes the computing device to perform one or more of the methods described may be provided.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processing device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processing device can be or include a microprocessor, but in the alternative, the processing device can be or include a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a computer-readable memory storing executable instructions; and
    one or more physical computer processors in communication with the computer-readable memory, wherein the one or more physical computer processors are programmed by the executable instructions to at least:
        obtain a plurality of sequences of movie identifiers indicating a history of movies watched by a plurality of users;
        identify a first history randomization profile for the plurality of sequences of movie identifiers, the first history randomization profile including information indicating:
            every movie identified in each of the plurality of sequences of movie identifiers is a candidate for randomization, wherein a candidate for randomization is an item included in a sequence of movie identifiers that may be moved to a new location within the sequence of movie identifiers; or
            a first subset of movies identified in each of the plurality of sequences of movie identifiers which are candidates for randomization;
        generate a plurality of randomized sequences of movie identifiers by randomizing the plurality of sequences of movie identifiers using the first history randomization profile;
        transmit the plurality of randomized sequences of movie identifiers to a recurrent neural network language modeling device;
        receive a recurrent neural network language model including latent feature vectors identifying a categorization for an input sequence of previously accessed movies, the categorization describing the sequence of previously accessed movies;
        receive a request from an access device of a user of the plurality of users, the request including information indicative of an access history for the user; and
        identify a user sequence categorization for the user using the recurrent neural network language model and the access history for the user.

2. The system of claim 1, wherein the recurrent neural network language model comprises a skip-gram model of the plurality of sequences of movie identifiers identifying latent common features between movies.

3. The system of claim 1, wherein at least one of frequency of access or duration of access for the movies included in the access history for the user is used as an input weighting factor to weight the respective movie identifier input to the recurrent neural network language model.

4. The system of claim 1, wherein at least one of frequency of access or duration of access for the movies included in the access history for the user is used as a result weighting factor to weigh the respective latent feature output generated using the respective movie identifier as an input.

5. The system of claim 1, further comprising instructions to:
    identify a second history randomization profile for access history for the user, the second history randomization profile including information indicating:
        every movie identifier included in the access history is a candidate for randomization; or
        a first subset of movie identifiers included in the access history which are candidates for randomization; and
    generate a randomized access history by randomizing the movie identifiers included in the access history using the second history randomization profile,
    wherein identifying the user sequence categorization for the user uses the randomized access history for the user.

6. A computer-implemented method comprising:
    under control of one or more computing devices configured with specific computer-executable instructions,
        obtaining a plurality of sequences of item identifiers indicating a history of items accessed;
        randomizing an order of item identifiers included in at least a portion of the plurality of sequences of item identifiers to generate a randomized plurality of sequences of item identifiers;
        generating a language model using the randomized plurality of sequences of item identifiers as the words of the language modeled by the language model, the language model configured to provide one or more candidate predictions for items of a processing target;
        receiving a request from an access device of a processing target, the request including information indicative of items for the processing target;
        generating a candidate prediction for the processing target using the language model and the items for the processing target; and
        providing a prediction for the processing target using the candidate prediction.

7. The computer-implemented method of claim 6, wherein the language model comprises a recurrent neural network language model.

8. The computer-implemented method of claim 7, wherein generating the recurrent neural network language model comprises skip-gram modeling of the plurality of sequences of item identifiers to identify latent common features between items.

9. The computer-implemented method of claim 6, wherein the processing target is one of:
    a user of the access device;
    a session initiated by the access device; or
    an aggregation of items, the items aggregated from access histories of multiple users having common geographic, demographic, or behavior characteristics.

10. The computer-implemented method of claim 6, further comprising instructions for obtaining item access metrics for the items for the processing target, wherein generating the candidate prediction includes weighting an item included in the items for the processing target using the associated item access metric for the item when processed by the language model.

11. The computer-implemented method of claim 6, further comprising instructions for obtaining a value indicating a strength of relatedness to the processing target for the candidate prediction.

12. The computer-implemented method of claim 11, further comprising instructions for identifying a second candidate prediction, and
wherein providing the prediction comprises:
obtaining a first strength value for the candidate prediction and a second strength value for the second candidate prediction, wherein the first strength value indicates a higher degree of relation for the candidate prediction than the second strength value for the second candidate prediction; and
selecting the candidate prediction as the prediction using the first strength value and the second strength value.

13. The computer-implemented method of claim 11, wherein providing a prediction comprises:
obtaining a strength value for the candidate prediction;
obtaining a minimum candidate strength; and
selecting the candidate prediction as the prediction when the strength value is greater than or equal to the minimum candidate strength.

14. The computer-implemented method of claim 6, wherein generating the language model comprises generating a neural network prediction model, wherein generating the language model comprises:
generating a latent feature language model using the randomized plurality of sequences of item identifiers as the words of the language modeled by the latent feature language model;
obtaining a training data set, the training data set including sequences of item identifiers and previously assigned predictions for the sequences;
obtaining latent features for the sequences of item identifiers; and
generating the neural network prediction model using the training data set, wherein inputs to the neural network prediction model include the obtained latent features for the sequences of item identifiers.

15. The computer-implemented method of claim 6, further comprising instructions for generating a randomized list of item identifiers by randomizing the order of item identifiers included in at least a portion of item identifiers for the items for the processing target,
wherein generating the candidate prediction for the processing target uses the randomized list of item identifiers for the processing target.

16. A non-transitory computer readable medium storing a computer-executable module that, when executed by a processor of a computing device, cause the computing device to perform a process comprising:
obtaining a plurality of sequences of item identifiers indicating a history of items accessed;
randomizing an order of item identifiers included in at least a portion of the plurality of sequences of item identifiers to generate a randomized plurality of sequences of item identifiers;
generating a language model using the randomized plurality of sequences of item identifiers, the language model configured to provide one or more candidate categories for items of a processing target;
receiving a request from an access device of a processing target, the request including information indicative of items for the processing target;
generating a candidate prediction for the processing target using the language model and the item for the processing target; and
providing a prediction for the processing target using the candidate prediction.

17. The non-transitory computer readable medium of claim 16, wherein the language model comprises a recurrent neural network language model.

18. The non-transitory computer readable medium of claim 17, wherein generating the recurrent neural network language model comprises skip-gram modeling of the plurality of sequences of item identifiers to identify latent common features between items.

19. The non-transitory computer readable medium of claim 16, wherein the processing target is one of:
a user of the access device;
a session initiated by the access device; or
an aggregation of items, the items aggregated from access histories of multiple users having common geographic, demographic, or behavior characteristics.

20. The non-transitory computer readable medium of claim 16, wherein the process performed by the computer-executable module, when executed by the processor of the computing device, further comprises obtaining item access metrics for the items for the processing target, wherein generating the candidate prediction includes weighting an item included in the items for the processing target using the associated item access metric for the item when processed by the language model.

21. The non-transitory computer readable medium of claim 16, wherein the process performed by the computer-executable module, when executed by the processor of the computing device, further comprises obtaining a value indicating a strength of relatedness to the processing target for the candidate prediction from the model.

22. The non-transitory computer readable medium of claim 21, wherein the process performed by the computer-executable module, when executed by the processor of the computing device, further comprises identifying a second candidate prediction, and
wherein providing the prediction comprises:
obtaining a first strength value for the candidate prediction and a second strength value for the second candidate prediction, wherein the first strength value indicates a higher degree of relation for the candidate prediction than the second strength value for the second candidate prediction; and
selecting the candidate prediction as the prediction using the first strength value and the second strength value.

23. The non-transitory computer readable medium of claim 21, wherein providing a prediction comprises:
obtaining a strength value for the candidate prediction;
obtaining a minimum candidate strength; and
selecting the candidate prediction as the prediction when the strength value is greater than or equal to the minimum candidate strength.

24. The non-transitory computer readable medium of claim 16, wherein the process performed by the computer-executable module, when executed by the processor of the computing device, further comprises generating a randomized list of item identifiers by randomizing the order of item identifiers included in at least a portion of item identifiers for the items for the processing target,
 wherein identifying the candidate prediction for the processing target uses the randomized list of item identifiers for the processing target.

25. The non-transitory computer readable medium of claim 16, wherein generating the language model comprises generating a neural network prediction model, wherein generating the language model comprises:
 generating a latent feature language model using the randomized plurality of sequences of item identifiers as the words of the language modeled by the latent feature language model;
 obtaining a training data set, the training data set including sequences of item identifiers and previously assigned predictions for the sequences;
 obtaining latent features for the sequences of item identifiers; and
 generating the neural network prediction model using the training data set, wherein inputs to the neural network prediction model include the obtained latent features for the sequences of item identifiers.

* * * * *